Jan. 30, 1968 T. K. LINDQUIST ET AL 3,366,209
FRICTION PLATE EMPLOYING SEPARATOR MEANS
Filed Feb. 10, 1966 4 Sheets-Sheet 1

INVENTORS.
TERRY K. LINDQUIST
BY RICHARD L. SMIRL
Joseph W. Malleck
ATTY.

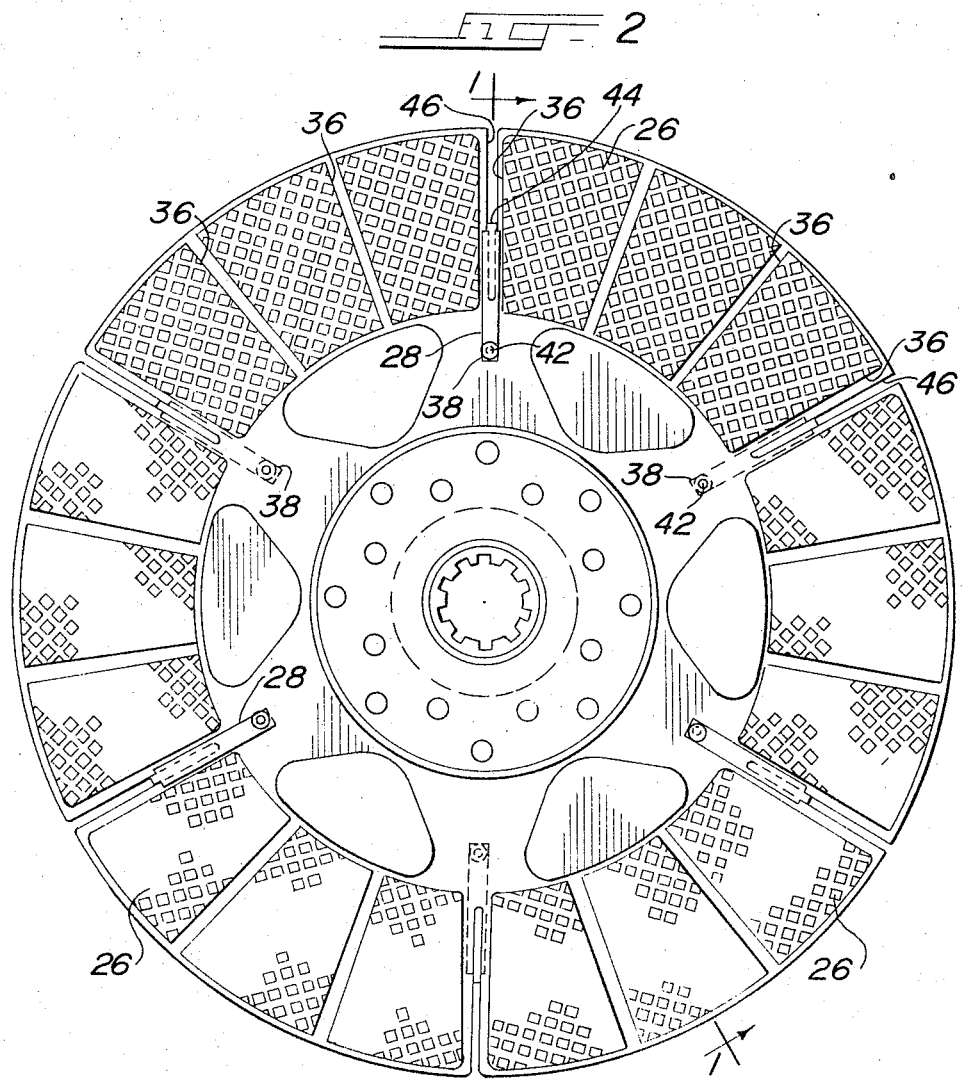

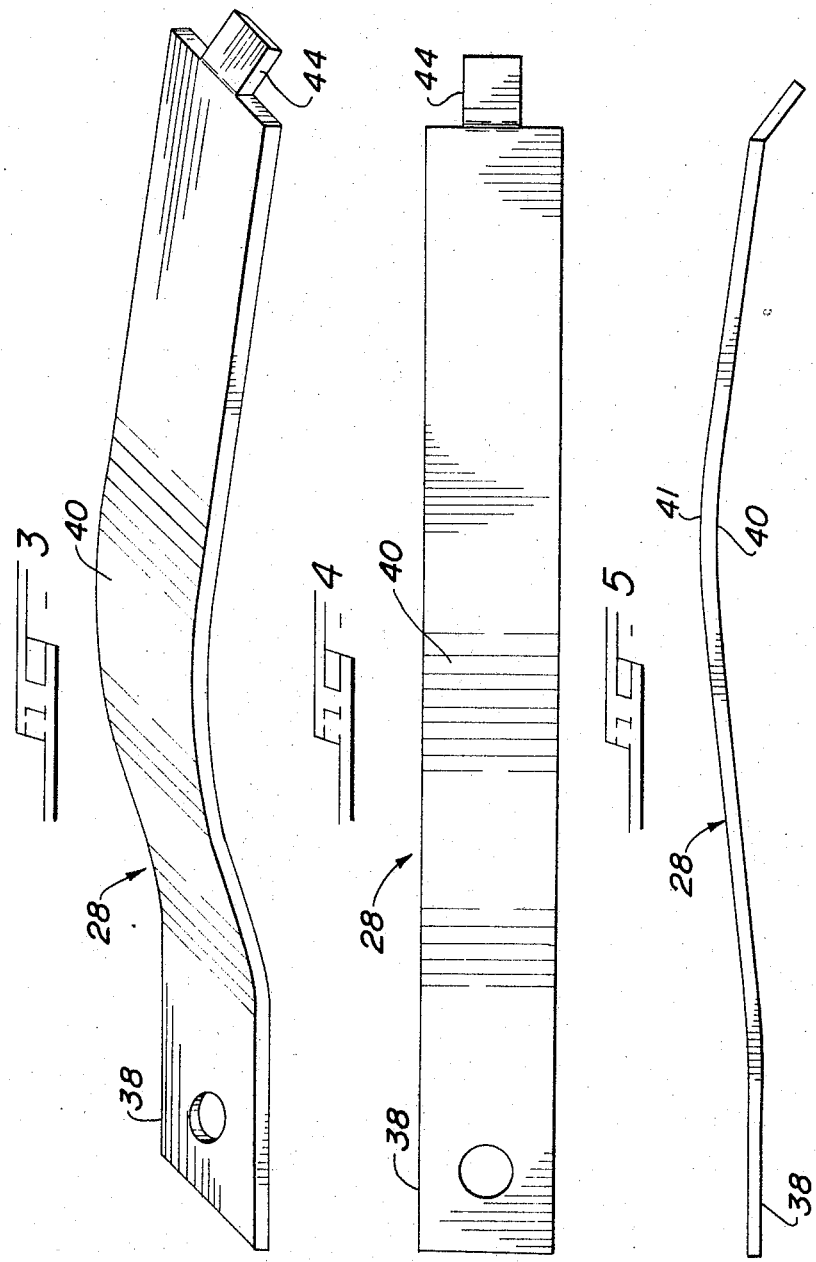

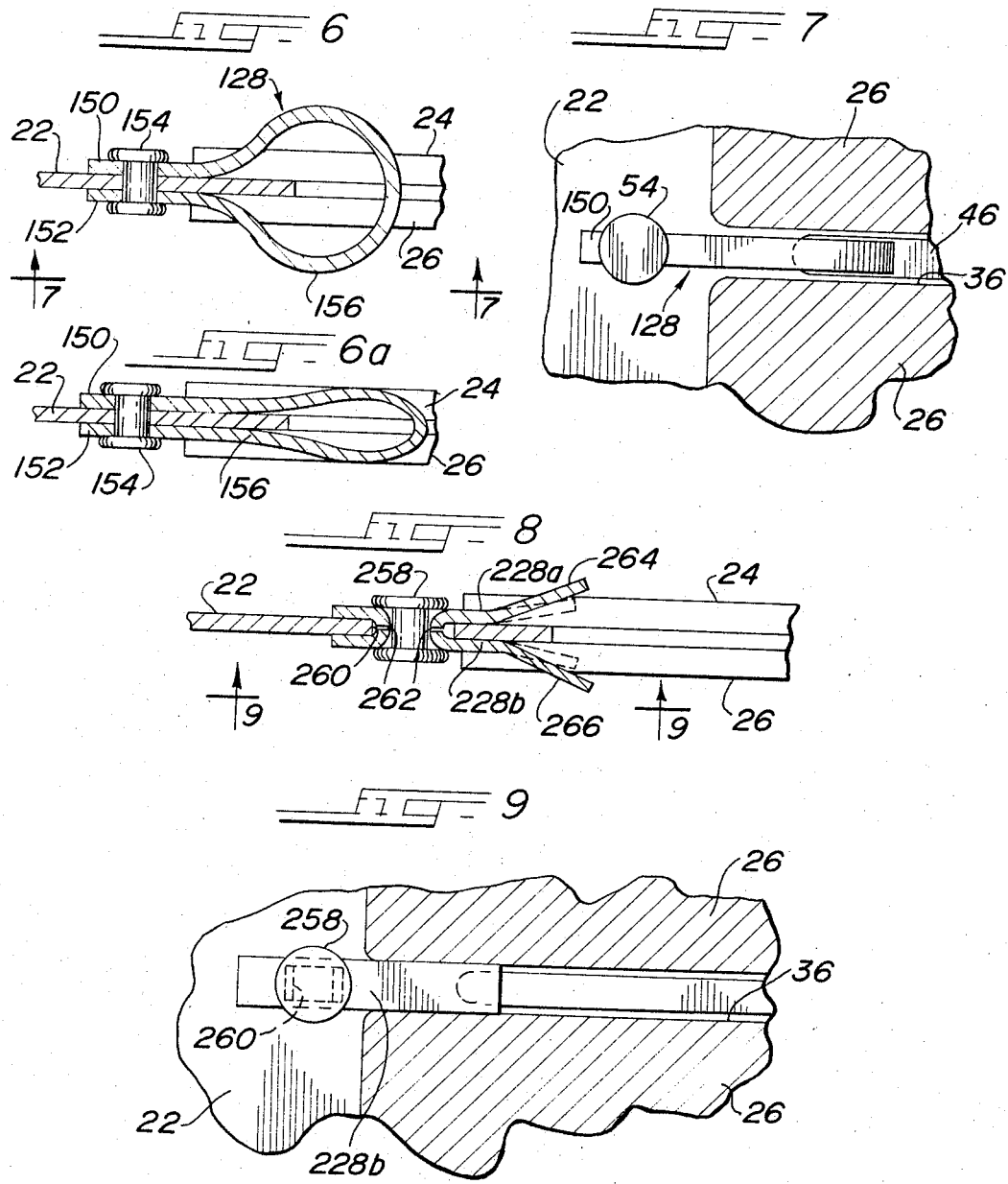

United States Patent Office 3,366,209
Patented Jan. 30, 1968

3,366,209
FRICTION PLATE EMPLOYING SEPARATOR MEANS
Terry K. Lindquist, Crestwood, and Richard L. Smirl, La Grange Park, Ill., assignors to Borg-Warner Corporation, Chicago, Ill., a corporation of Illinois
Filed Feb. 10, 1966, Ser. No. 526,554
4 Claims. (Cl. 192—107)

ABSTRACT OF THE DISCLOSURE

A driven member disc is provided with a plurality of radially oriented resilient finger members which are disposed in radially oriented channels formed by spaced apart segments of friction facing material to insure disengagement of the driven member from the pressure plate and flywheel of an axially engaging clutch.

---

This invention relates to friction discs and more particularly to a friction disc incorporating improved means for postively releasing such a disc into engagement with a driving member.

It is desirable in units such as an automotive clutch, for example, that disengagement of the clutch unit be accomplished quickly without any drag. Particularly, in wet clutch systems, the problem of incomplete disengagement is widespread. The symptoms characteristic of the incomplete disengagement as noticed by a consumer in his application would be gear roll or clash when shifting into an unsynchronized gear.

In an automotive clutch installation, for example, including a flywheel, a pressure plate and a driven clutch plate which is brought into engagement with the flywheel and pressure plate, the presence of oil in the clearances between these elements gives rise to a problem of dynamic shear. In other words, the oil itself, between the various members, tends to transmit a small amount of torque. This is accentuated by grooving in the friction discs which tends to make the clutch even more like a fluid coupling. Cold weather also accentuates the problem because it makes the oil very thick thereby increasing its shear carrying capability.

Another cause of incomplete disengagement encountered in wet clutch installations is sometimes referred to as drill block action. In essence, the oil tends to seal the interface of the friction members sufficiently to build up a cohesive force comparable to that encountered when using measurement drill blocks.

In addition, if the engine-drive line is installed at an angle in an automotive vehicle, the axial component of the gravity force may have a tendency to urge a driven clutch plate into engagement with the pressure plate or the flywheel depending on the angle of installation.

Various means have been tried to reduce the tendency for disengaged torque transmission. One group of such attempts might be referred to in a generic sense as the integral plate spring method. For example, so-called full segment bending has been used. Each of the segments or friction pads of the clutch disc body is bent a slight amount at the outer periphery, about .030 of an inch, for example, either toward or away from the flywheel to push it away from the flywheel surface upon a releasing movement of the pressure plate. While this method would produce the necessary force to assure disengagement the bend would have to be controlled. Since the bend would be a rather large radius, control of this aspect during manufacture presents some problem, and the problem is particularly acute when the bending operation is to be performed on clutch discs made of high carbon steel. This method proved to be impractical from a manufacturing standpoint.

The integral plate spring method is illustrated, for example, by the U.S. Patent 2,856,049 to H. O. Schjolin issued Oct. 14, 1958 and another U.S. Patent 3,174,602 to Schjolin issued Mar. 23, 1965. In addition to the undersirability of the spring members being formed from the clutch disc itself it may be observed that a considerable amount of friction material is cut away to provide space for the spring members with a consequent reduction in torque capacity, and increase in unit loading, consequently increasing wear.

Another method that was tried and discarded was that of bending the clutch plate into a dish shape on the order of a Belleville spring. Manufacturing problems again made this method impractical. In addition, it must be recognized that the clearance between the clutch plate and a pressure plate on one side and the clutch plate and a flywheel on the other side when the clutch is disengaged is quite small. Thus the dish shape bend of the plate could not be so large that the O.D. of the friction elements at one interface, (at the pressure plate, for example) and the I.D. of the friction elements at the other interface, (at the flywheel, for example) would make contact simultaneously when the pressure plate is completely disengaged.

It is, therefore, an object of the invention to provide a friction disc or plate which incorporates means for effecting a rapid disengagement of the friction plate from associated members with a minimum of drag.

A further object is to incorporate in a friction disc or plate resilient spring means for effecting rapid and complete disengagement of the friction plate from associated members.

Another object is to provide a friction plate wherein the means used to effect rapid and complete disengagement from associated members will produce only a minimum torque as a result of its separating force.

A further object is to provide a friction plate in accordance with the preceding objects which is easy to manufacture.

The above and other objects and advantages of the invention will be more readily apparent when read in connection with the accompanying drawings in which:

FIGURE 2 is a plan view of the clutch plate shown in FIGURE 1;

Figure 1:
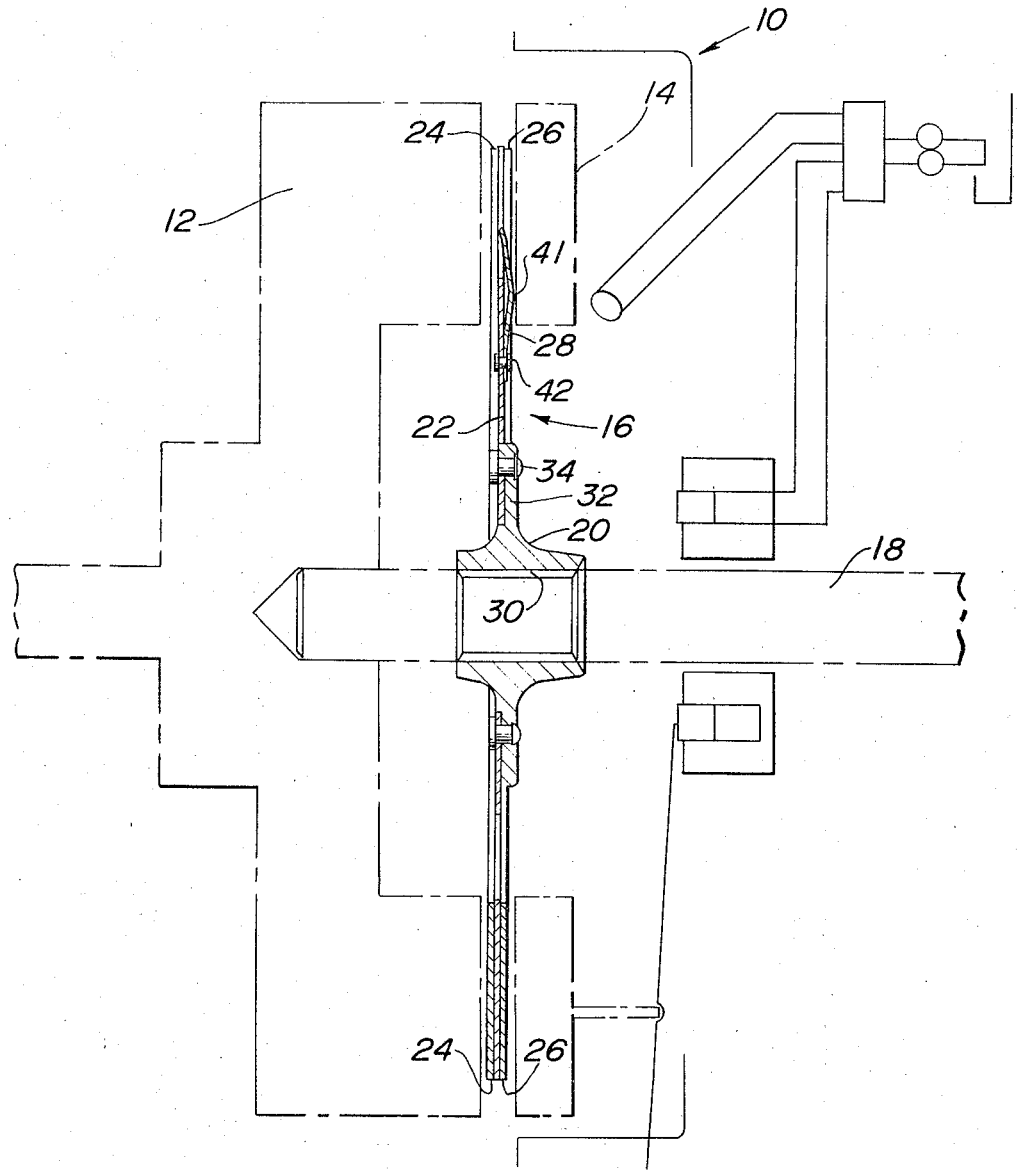
FIGURE 1 is a side view in elevation of a clutch plate embodying the invention shown in a disengaged position between a flywheel and a pressure plate.

FIGURES 3, 4, and 5 are perspective, plan and elevation views respectively of a preferred embodiment of a disengaging spring member used in the clutch plate of FIGURES 1 and 2;

FIGURES 6, 6a, and 7 are partial views in section showing a first modified form of a disengaging spring member; and FIGURES 8 and 9 are partial views in section illustrating a second modified form of a disengaging spring member.

Referring now to the drawings, wherein like reference characters in the different figures are used to designate the same parts 10 designates generally a clutch unit to transmit drive from a driving member to a driven member.

The clutch unit 10 comprises a flywheel 12 connected to and rotatably driven by a prime mover (not shown) such as an automotive engine. The unit 10 also comprises a pressure plate 14 adapted to be actuated in a normal manner. A unit such as that shown in FIGURE 1 may also include a clutch cover plate (not shown) which may be attached to the flywheel 12 by bolts or other suitable means so that it may rotate with the flywheel. Such a construction is shown, for example, in the U.S. Patent 3,167,163 to Smirl et al., issued January 26, 1965. That type of a unit may utilize a clutch plate embodying the invention disclosed herein. The unit 10 also comprises a clutch plate assembly 16 which is slidably mounted on a driven shaft 18.

The clutch plate assembly 16 comprises a hub member 20, an annular clutch plate or disc 22 supported on the hub member 20, a plurality of friction elements 24 and 26 and a plurality of disengaging spring fingers 28.

The hub member 20 is formed with internal splines 30 and is slidingly supported on complementary portions on the driven shaft 18, the hub member being disposed for axial movement on the shaft 18.

The annular clutch plate or disc 22 is a flat plate with an opening at its center to receive the hub 20. It is secured to a radially extending flange 32 on the hub 20 by a suitable means such as rivets 34.

Friction elements 24 and 26 are secured to opposite sides of the clutch plate 22 at the outer periphery thereof. The friction elements in the embodiment illustrated are in the form of segments which are spaced from each other circumferentially to define channels 36 between adjacent segments. When a clutch plate assembly of this type is used in a wet clutch the channels 36 are effective to promote the flow of oil to dissipate the heat of friction created during operation of the clutch.

The clutch plate assembly 16 also comprises a plurality of disengaging spring elements circumferentially spaced around the clutch plate. The purpose of these spring elements, which may also be referred to as spring fingers, is to effect a quick and positive disengagement of the clutch, that is, to eliminate or neutralize, insofar as it is possible, all undesribale conditions which tend to prevent complete disengagement. A preferred embodiment of a spring element is shown in detail and designated by a numeral 28 in FIGURES 3, 4 and 5 and is shown in the clutch plate assembly in FIGURES 1 and 2. The spring fingers are referred to herein as "independent" finger members which are attached to the clutch disc 22 by suitable means. This is to distinguish from integral members which are formed from a clutch disc itself. The element 28 comprises a spring finger-like element preferably made of a resilient spring metal material. As observed in FIGURES 1, 3 and 5 it is bowed substantially at its middle portion 40. One end 38 of the spring finger 28, which is flat, is secured to clutch disc 22 by suitable means such as a rivet 42 at a position which is radially inwardly of the inner edge of the friction elements 24 and 26. As best seen in FIGURE 1 the spring fingers 28 are substantially radially directed and extend into the channels 36 between a pair of adjacent friction elements.

It will be observed in the embodiment illustrated that there are more channels 36 than there are spring fingers 28. These channels are used, of course, as previously described for the purpose of carrying oil and flowing oil across the friction plate. Thus they are available to accommodate the spring fingers in the manner shown. It is conceivable, of course, that the channels 36 which are used to receive the spring fingers might be made slightly wider than would normally be the case in order to accommodate a wider spring finger. The spring fingers 28 extend from their anchored position along the channel to a point approximately midway of the radial extent of the friction elements. Since the spring fingers are bowed at approximately midway their length the bulge or crown is substantially at the inner radial extremity of the friction elements. It is the bulge 40 created by the bowing and defined by the outer curved surface 41 which is effective to urge the friction disc relatively away from the flywheel 12 and pressure plate 14 between which it is positioned when disengagement is desired. It is important that this bulge or bowed portion contact the adjacent members as far radially inwardly as possible to minimize the torque exerted by the expanding force of the spring elements.

The spring members 28 have a tang 44 formed on the outermost end which is adapted to ride in a radially extending slot 46 formed in the periphery of the disc 22 in the bottom of the channel 36. Thus the tang serves as a guide for the spring member 28.

It will be observed that six spring fingers 28 are used in connection with the embodiment illustrated. They are equally spaced circumferentially and are positioned alternately on opposite sides of the disc 22. The group on one side acts against the pressure plate 14 and the group on the other side acts against the flywheel 12. This is effective to centralize the clutch plate in the gap between the flywheel and pressure plate. A greater or lesser number of spring fingers could be used depending on the application.

As reviously indicated the spring fingers preferably are made of a resilient metal which may be easily flexed and which is particularly adaptable to a large number of flexing motions without deteriorating due to metal fatigue, for example. One of the distinct advantages of making the spring fingers as independent members which are secured to the disc 22 is that it permits the choice of a proper type of material which is more suitable for the job and can withstand a large number of flexing actions better than the plate material itself. It will be appreciated that if the spring fingers were made of the same material as the disc 22 the choice of characteristics most suitable to serve the function of the spring fingers would be substantially limited.

Furthermore, the rather close control of the force to be exerted by the spring fingers would present a difficult manufacturing problem if the spring fingers were to be formed out of the clutch disc itself.

In addition, it has been found that the amount of bowing of the finger element 28 at its middle portion 40 is important to the control of the force that is to be exerted by the spring member. As clearly seen in FIGURE 1 it is the outside curved surface 41 of the crown which contacts the pressure plate 14 and, of course, the curved surfaces 41 of the spring members 28 on the other side of the disc 22 would contact the flywheel 12. The force of contact of the spring members formed in this manner as well as the equalizing of the forces to be exerted by the individual spring fingers can be more accurately controlled if the spring members are formed as individual independent elements as opposed to forming them out of the disc itself.

It has also been found that the axial forces to be exerted by a spring finger can be accurately controlled designwise if a bowed element of the type illustrated in FIGURES 3, 4 and 5 is used.

It is contemplated that the spring fingers will be made out of a strip stock which would allow the grain to be consistently in one direction. A forming die can be accurately designed to cope with the single-direction grain structure. The single-direction grain structure enables the dies to produce a more accurately controlled crown height and bowing.

The use of independent spring finger members generally has the advantage over integral spring fingers in that they can be easily replaced. On the other hand, if an integral finger member breaks, the whole clutch plate assembly probably would have to be replaced.

In operation when the clutch is to be engaged the pressure plate 14 would be moved to the left as viewed in FIGURE 1 to clamp the friction elements 24 and 26 between the pressure plate 14 and the flywheel 12. This squeezes the spring fingers 28 into their respective channels 36. This flattens them out into a position no greater than the thickness of the friction elements under compression. As soon as the pressure plate is released the spring fingers 28 will become rapidly unflexed and assume their bowed disposition extending axially beyond the friction facings. Since these spring fingers are placed alternately on each side of the friction plate they will unflex to position the friction plate substantially in the center of the space between the pressure plate 14 and flywheel 12. The outer curved surface of the crown portions 41 will contact the flywheel 12 and pressure plate 14 and a definite clearance will exist between the friction elements 24 and 26 and the adjacent members, the flywheel 12 and pressure plate 14.

Although the spring finger feature can be used in either a wet or dry clutch installation it is particularly useful in a wet clutch where the cohesive force between the friction elements and the adjacent members must be overcome. This cohesive force is one of the main forces tending to prevent complete and rapid disengagement, and the spring fingers must store enough energy to overcome this cohesive force upon disengagement.

Modified forms of spring fingers designed to effect complete disengagement of a clutch are shown in FIGURES 6–9. The first modified is shown in FIGURES 6–7. In this form the spring finger is an elongated metal strip formed into a single spring loop 128. It has two ends 150 and 152 secured to opposite sides of the clutch plate 22 slightly inwardly of the inner edge of the friction elements 24 and 26 by suitable means such as rivets 154. The strip being bent back upon itself defines a bulging body portion 156. The spring finger 128 may be made of the same type of material, such as a spring steel, as the spring finger 28. It is made narrow enough to fit into channel 36 and to extend through slot 46. The normal unflexed condition of the spring finger 128 is shown in FIGURE 6. In its natural state the body 156 of the loop may define a substantially circular portion with a crown or bulge extending axially beyond the faces of the friction elements 24 and 26. In FIGURE 6a the spring loop 128 is shown in a compressed state, that is, substantially the flattened position it would occupy between the pressure plate 14 and flywheel 12 while the clutch unit is engaged. Here again the body 156 of the spring loop 128 is positioned in the vicinity of the radial inner edge of the friction elements 24 and 26 to minimize the torque exerted by contact with the pressure plate and flywheel.

A second modified form of disengaging spring elements is shown in FIGURES 8 and 9. In this form the spring element comprises a pair of spring fingers 228a and 228b which are secured to opposite sides of the clutch disc 22 at their inner ends by suitable means such as a rivet 258. To prevent rotation of the spring fingers the clutch disc 22 may be formed with a square hole 260 for receiving small flange portions 262 of the spring fingers. These spring fingers 228a and 228b are in the form of elongated metal strips the outer ends 264 and 266 of which are bent outwardly beyond the face of the friction elements 24 and 26. They may be made of the same material as spring fingers 28 and 128.

It will be observed that the outer ends 264 and 266 of the spring fingers are also positioned in the vicinity of the radial inner edge of the friction elements 24 and 26 again to minimize the torque exerted by contact with the pressure plate and flywheel. In FIGURE 8 the spring fingers 264 and 266 are also shown in dotted line positions to illustrate their position during clutch engagement when they fold into the channel 36 between adjacent friction elements 24 on one side of the clutch plate and between adjacent friction elements 26 on the other side of the clutch plate. While the embodiment illustrated in FIGURES 8 and 9 shows a pair of spring fingers 264 and 266 oppositely disposed on the same radial line it will be appreciated that only one of these fingers might be used at each radial position. For example, if a clutch plate as shown in FIGURE 2 were used with fingers at six equally spaced positions then three fingers 264 would be disposed on one side and three fingers 266 would be disposed alternately on the other side as shown in FIGURE 2.

Thus, it becomes apparent that we have provided an improved clutch plate which can be positively disengaged from its adjacent contacting members. Because the spring fingers are not made from the clutch plate itself more accurate manufacturing control can be maintained over the force to be exerted by the spring fingers. In this regard it will be appreciated that the spring fingers can be made of a different material such as a spring steel which is more suitable for the purpose. Such a material also generally exhibits better wear characteristics than the plate material. There is also a distinct advantage in placing the spring fingers as far radially inwardly as possible in order to reduce the torque caused by the separating force of the spring fingers.

While certain embodiments of the invention have been specifically disclosed, it is to be understood that the invention is not limited thereto as many variations will be readily apparent to those skilled in the art and the invention is to be given its fullest possible interpretation within the terms of the following claims.

We claim:

1. A friction plate comprising: a disc member; friction means secured to said disc member; said friction means including a plurality of segments disposed about the periphery of said disc member, said segments being circumferentially spaced from each other to define therebetween substantially radially disposed channels; a plurality of resilient members connected to said disc member for effecting disengagement from an adjacently disposed member which is adapted to engage said friction means; said resilient means being aligned with and adapted when compressed to fit into certain of said channels during the engagement of said friction means with said adjacently disposed member; slot means formed in said disc member in registry with said channels, said slot means being adapted to receive a portion of said resilient members to assist in retaining said resilient members in their desired position.

2. The friction plate of claim 1 wherein each of said resilient members comprises an elongated strip of metal substantially radially disposed, the inner end of said strip being connected to the disc, the outer end having a tang portion formed thereon to be received by said slot means, and the intermediate portion of said strip being bowed outwardly to extend beyond the face of said friction means.

3. The friction plate of claim 1 including said slot means formed in said disc member, said slot means being adapted to receive a portion of said resilient members, each of said members comprising an elongated strip of resilient metal formed into a loop having a body portion and two ends, the two ends of the loop being secured to the disc member and the body of the loop extending through said slot means.

4. The friction plate of claim 3 wherein said body portion extends axially beyond the face of said friction means at a position near the radial inner edge of said friction means.

References Cited

UNITED STATES PATENTS

| 2,523,501 | 9/1950 | Davies et al. | 192—69 |
| 2,653,692 | 9/1953 | Polomski | 192—68 |
| 2,856,049 | 10/1958 | Schjolin | 192—107 |

FOREIGN PATENTS

| 645,029 | 5/1937 | Germany. |
| 7,848 | 4/1906 | Great Britain. |

BENJAMIN W. WYCHE III, *Primary Examiner.*